United States Patent
Hiramura et al.

(10) Patent No.: US 9,653,924 B2
(45) Date of Patent: May 16, 2017

(54) BATTERY SYSTEM

(75) Inventors: Yasuaki Hiramura, Tokyo (JP); Naoki Sonoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 637 days.

(21) Appl. No.: 14/234,297

(22) PCT Filed: Jul. 24, 2012

(86) PCT No.: PCT/JP2012/068691
§ 371 (c)(1),
(2), (4) Date: Jan. 22, 2014

(87) PCT Pub. No.: WO2013/015273
PCT Pub. Date: Jan. 31, 2013

(65) Prior Publication Data
US 2014/0197686 A1    Jul. 17, 2014

(30) Foreign Application Priority Data
Jul. 28, 2011 (JP) ................................. 2011-165219

(51) Int. Cl.
*H02J 4/00* (2006.01)
*H02J 7/00* (2006.01)
(Continued)

(52) U.S. Cl.
CPC ................ *H02J 4/00* (2013.01); *B60L 3/003* (2013.01); *B60L 11/1803* (2013.01);
(Continued)

(58) Field of Classification Search
CPC .. B60L 11/1803; B60L 11/1866; B60L 3/003; B60L 2210/10; B60L 2210/30;
(Continued)

(56) References Cited

U.S. PATENT DOCUMENTS 6,741,065 B1 * 5/2004 Ishii .................... B60L 11/1816
320/122
2007/0188136 A1 * 8/2007 Oh ........................ H02J 7/0073
320/115
(Continued)

FOREIGN PATENT DOCUMENTS

EP    1 223 653 A1    7/2002
JP    2000-324704 A   11/2000
(Continued)

OTHER PUBLICATIONS

Translation of JP 2000324704 A.*
(Continued)

*Primary Examiner* — Hal Kaplan
*Assistant Examiner* — Elim Ortiz
(74) *Attorney, Agent, or Firm* — Westerman, Hattori, Daniels & Adrian, LLP

(57) ABSTRACT

A battery system includes a power supply device which supplies power, a battery device in which a plurality of substantially identical battery units are connected in parallel, and a control device including a storage unit which stores information about a reference power value corresponding to predetermined conversion efficiency of the power conversion unit, an acquisition unit which acquires information about a supply power amount of the power supplied by the power supply device, and a selection unit which determines the number of battery units capable of distributing the supply power amount at a power amount greater than or equal to the reference power value and selects the battery units to which the power is supplied from the power supply device among the plurality of battery units, wherein the selected battery units are equal in number to the determined number.

13 Claims, 8 Drawing Sheets

(51) Int. Cl.
*B60L 3/00* (2006.01)
*B60L 11/18* (2006.01)
*H01M 10/44* (2006.01)
*H02J 7/34* (2006.01)
*H01M 10/42* (2006.01)
*H02J 7/02* (2016.01)
*H02J 7/35* (2006.01)

(52) U.S. Cl.
CPC ....... *B60L 11/1866* (2013.01); *H01M 10/441* (2013.01); *H02J 7/0013* (2013.01); *H02J 7/34* (2013.01); *B60L 2210/10* (2013.01); *B60L 2210/30* (2013.01); *B60L 2230/24* (2013.01); *B60L 2240/547* (2013.01); *B60L 2240/549* (2013.01); *H01M 2010/4271* (2013.01); *H01M 2220/20* (2013.01); *H02J 7/0021* (2013.01); *H02J 7/02* (2013.01); *H02J 7/35* (2013.01); *Y02E 10/766* (2013.01); *Y02T 10/7005* (2013.01); *Y02T 10/7055* (2013.01); *Y02T 10/7061* (2013.01); *Y02T 10/7088* (2013.01); *Y02T 10/7216* (2013.01); *Y02T 10/7241* (2013.01); *Y02T 90/12* (2013.01); *Y10T 307/391* (2015.04)

(58) Field of Classification Search
CPC ........... B60L 2230/24; B60L 2240/547; B60L 2240/549; H01M 10/441; H01M 2010/4271; H01M 2220/20; H02J 4/00; H02J 7/0013; H02J 7/34; H02J 7/0021; H02J 7/02

USPC ........................................................ 307/29
See application file for complete search history.

(56) References Cited

U.S. PATENT DOCUMENTS

2010/0181829 A1  7/2010  Ichikawa et al.
2013/0175975 A1*  7/2013  Shinozaki ........... B60L 11/1864
                                                          320/106

FOREIGN PATENT DOCUMENTS

| JP | 2000324704 A | * | 11/2000 |
| JP | 2005-287146 A | | 10/2005 |
| JP | 2008-220104 A | | 9/2008 |
| JP | 2009-33785 A | | 2/2009 |
| JP | 2009-197587 A | | 9/2009 |
| JP | 2010-028881 A | | 2/2010 |
| JP | 2011-103746 A | | 5/2011 |

OTHER PUBLICATIONS

International Search Report for PCT/JP2012/068691, Mailing Date of Oct. 30, 2012.
Written Opinion dated Oct. 30, 2012, issued in Corresponding Application No. PCT/JP2012/068691, with English Translation (7 pages).
Extended European Search Report dated Apr. 8, 2015, issued in corresponding Application No. 12818252.4 (7 pages).

* cited by examiner

FIG. 7A

| BATTERY UNIT | SOC(%) | SUPPLY POWER (kW) | PRIORITY |
|---|---|---|---|
| BATTERY UNIT 20A | 80 | — | 3 |
| BATTERY UNIT 20B | 60 | 50 | 1 |
| BATTERY UNIT 20C | 70 | 50 | 2 |

FIG. 7B

| BATTERY UNIT | SOC(%) | SUPPLY POWER (kW) | PRIORITY |
|---|---|---|---|
| BATTERY UNIT 20A | 80 | 50 | 3 |
| BATTERY UNIT 20B | 70 | 50 | 1 |
| BATTERY UNIT 20C | 80 | 50 | 2 |

FIG. 7C

| BATTERY UNIT | SOC(%) | SUPPLY POWER (kW) | PRIORITY |
|---|---|---|---|
| BATTERY UNIT 20A | 87 | 50 | 3 |
| BATTERY UNIT 20B | 87 | 50 | 1 |
| BATTERY UNIT 20C | 87 | 50 | 2 |

FIG. 8A

| BATTERY UNIT | SOC(%) | SUPPLY POWER (kW) | PRIORITY |
|---|---|---|---|
| BATTERY UNIT 20A | 80 | — | 3 |
| BATTERY UNIT 20B | 60 | 50 | 1 |
| BATTERY UNIT 20C | 70 | — | 2 |

FIG. 8B

| BATTERY UNIT | SOC(%) | SUPPLY POWER (kW) | PRIORITY |
|---|---|---|---|
| BATTERY UNIT 20A | 80 | — | 3 |
| BATTERY UNIT 20B | 70 | 50 | 1 |
| BATTERY UNIT 20C | 70 | 50 | 2 |

FIG. 8C

| BATTERY UNIT | SOC(%) | SUPPLY POWER (kW) | PRIORITY |
|---|---|---|---|
| BATTERY UNIT 20A | 80 | 50 | 3 |
| BATTERY UNIT 20B | 80 | 50 | 1 |
| BATTERY UNIT 20C | 80 | 50 | 2 |

BATTERY SYSTEM

TECHNICAL FIELD

The present invention relates to a battery system, and more particularly, to a battery system which efficiently charges a plurality of battery modules.

Priority is claimed on Japanese Patent Application No. 2011-165219, filed Jul. 28, 2011, the content of which is incorporated herein by reference.

BACKGROUND ART

A battery system in which battery modules each including a plurality of chargeable/dischargeable battery cells are connected in parallel is known. This battery system, for example, charges the battery module with power from a power supply using natural energy such as wind power generation or solar power generation or power from a commercial power supply via a power converter such as an inverter or a converter.

As a method of charging the plurality of battery modules connected in parallel, for example, there is a method of selecting one battery module to supply power from the power supply to the selected battery module and switching a supply destination of the power to another battery module when the selected battery module has been fully charged (for example, see Patent Literature 1). In addition, a method of sequentially selecting one battery module with time and supplying the power from the power supply to the selected battery module (for example, see Patent Literature 2). In addition, a method of supplying the power from the power supply to a plurality of battery modules in parallel is also known (for example, see Patent Literature 3).

CITATION LIST

Patent Literature

[Patent Literature 1]
    Japanese Unexamined Patent Application, First Publication No. 2010-028881
[Patent Literature 2]
    Japanese Unexamined Patent Application, First Publication No. 2011-103746
[Patent Literature 3]
    Japanese Unexamined Patent Application, First Publication No. 2008-220104

SUMMARY OF INVENTION

Problem to be Solved by the Invention

However, the inventions disclosed in Patent Literature 1 and 2 need a sufficiently large amount of power to be supplied and a charging time greater than or equal to a fixed time to be secured in order to individually charge a plurality of battery modules. Thus, it is difficult to equally charge the battery modules connected in parallel when an amount of power to be supplied is insufficient or the charging time is short. For example, because an amount of power capable of being supplied is not fixed in the power supply using natural energy such as wind power generation or solar power generation, it may be difficult to sufficiently charge another battery module after one battery module has been charged when the amount of power capable of being supplied is small. In addition, it is difficult to equally charge each battery module when the charging time is short such as when there is no supply of power from the power supply immediately after the charging has been started or when switching from a charging mode to a discharging mode to be performed because it is necessary to discharge power of the battery module to a load even when the supply of power from the power supply is sufficient. When it is difficult to equally charge the plurality of battery modules as described above, for example, a load of charging/discharging may be concentrated on a specific battery module and the specific battery module may deteriorate compared to other battery modules. Thus, it is desirable to equally charge the battery modules.

According to the invention disclosed in Patent Literature 3, power is equally supplied to each battery module because the plurality of battery modules are charged in parallel. However, because the power is distributed, the power input to each power converter may be reduced, for example, if each power converter is provided between the battery module and the power supply, when an amount of power to be supplied is not sufficiently large. Thus, power conversion efficiency of the power converter may decrease. As a result, charging efficiency of each battery module may also decrease. It is known that, if there is not a fixed input power or more for the power converter such as an inverter or a converter, its power conversion efficiency excessively decreases.

The present invention provides a battery system capable of improving charging efficiencies of battery modules connected in parallel.

Means for Solving the Problem

A first aspect of a battery system according to the present invention includes a power supply device which supplies power; a battery device in which a plurality of substantially identical battery units are connected in parallel, wherein each battery unit includes a power conversion unit which converts the power supplied from the power supply device and a battery module which is charged with power converted by the power conversion unit; and a control device including a storage unit which stores information about a reference power value corresponding to predetermined power conversion efficiency of the power conversion unit, an acquisition unit which acquires information about a supply power amount of the power supplied by the power supply device, and a selection unit which determines the number of battery units capable of distributing the supply power amount at a power amount greater than or equal to the reference power value based on the information about the reference power value stored in the storage unit and the information about the supply power amount acquired by the acquisition unit and selects the battery units to which the power is supplied from the power supply device among the plurality of battery units, wherein the selected battery units are equal in number to the determined number.

According to the above-described battery system, it is possible to charge an optimum number of battery modules by maintaining a high charging rate because it is possible to select a battery unit to which power to be supplied among the plurality of battery units connected in parallel according to the supply power amount from the power supply device while considering power conversion efficiency of the power conversion unit.

In a second aspect of the battery system according to the present invention, the acquisition unit in the battery system of the above-described first aspect may be configured to acquire charging information representing a charging state of the battery module provided in each of the plurality of battery units. In addition, the selection unit may determine the number of battery units capable of distributing the supply power amount at a power amount greater than or equal to the reference power value based on the information about the reference power value stored in the storage unit and the information about the supply power amount and the charging information acquired by the acquisition unit, and select the battery units to which the power is supplied from the power supply device among the plurality of battery units, wherein the selected battery units are equal in number to the determined number.

In a third aspect of the battery system according to the present invention, when the supply power amount is less than the sum of reference power values of the plurality of battery units, the selection unit in the battery system of the above-described second aspect may determine priority for supplying the power to the battery unit in ascending order of charging state based on the charging information acquired by the acquisition unit. In addition, the selection unit may be configured to determine the number of battery units capable of distributing the supply power amount at a power amount greater than or equal to the reference power value based on the information about the reference power value stored in the storage unit and the information about the supply power amount and the charging information acquired by the acquisition unit, and select the battery units equal in number to the determined number according to the priority.

In a fourth aspect of the battery system according to the present invention, the control device in the battery system of the above-described third aspect may be configured to further include a switching unit through which the power supplied from the power supply device is supplied to the battery unit selected by the selection unit and having the battery module of the same or substantially same charging state by alternately switching at least two battery units having the same or substantially same charging state when the charging state of the battery module provided in at least one battery unit among the battery units selected by the selection unit is the same as or substantially the same as the charging state of the battery module provided in at least one battery unit among the battery units which are not selected by the selection unit.

In a fifth aspect of the battery system according to the present invention, the acquisition unit in the battery system of any one of the above-described first to fourth aspects may be configured to acquire the information about the supply power amount of the power supplied by the power supply device at a predetermined timing.

In a sixth aspect of the battery system according to the present invention, the predetermined power conversion efficiency in the battery system of the first to fifth aspects may be maximum power conversion efficiency in the power conversion unit.

Effects of the Invention

According to the battery system related to the above-described aspects of the present invention, it is possible to charge battery modules connected in parallel in a state in which high charging efficiency is maintained in consideration of power conversion efficiency of a power conversion unit.

BRIEF DESCRIPTION OF DRAWINGS

FIG. 7A is a diagram illustrating an example of the transition of a charging state when the battery system of the embodiment has been operated.

FIG. 7B is a diagram illustrating an example of the transition of a charging state when the battery system of the embodiment has been operated.

FIG. 7C is a diagram illustrating an example of the transition of a charging state when the battery system of the embodiment has been operated.

FIG. 8A is a diagram illustrating another example of the transition of a charging state when the battery system of the embodiment has been operated.

FIG. 8I is a diagram illustrating another example of the transition of a charging state when the battery system of the embodiment has been operated.

FIG. 8C is a diagram illustrating another example of the transition of a charging state when the battery system of the embodiment has been operated.

DESCRIPTION OF EMBODIMENTS

Hereinafter, a battery system 1 according to an embodiment of the present invention will be described. In the following embodiment, an example in which a wind power generation device is used as a power supply device and a converter which converts alternating current (AC) power to direct current (DC) power is used as a power conversion unit will be described.

Figure 1:
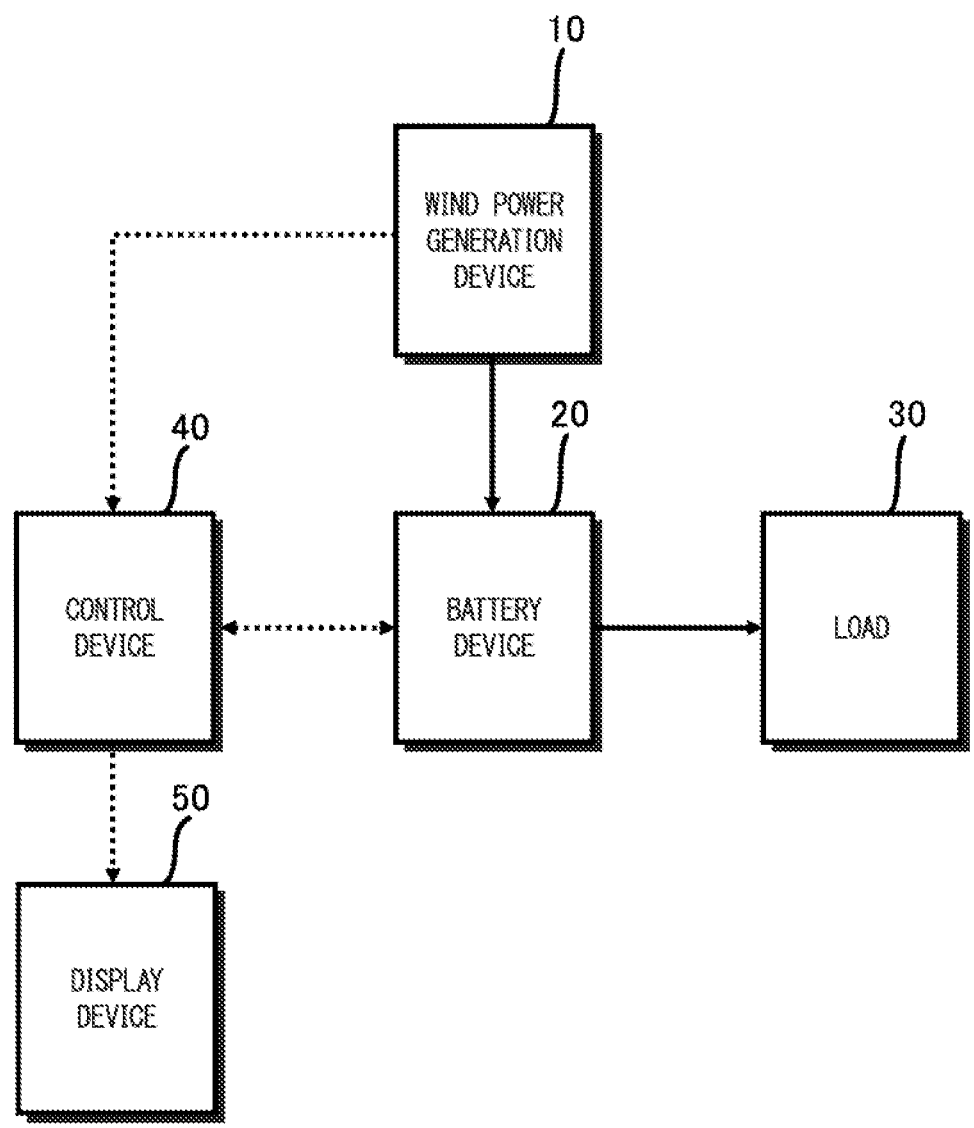
FIG. 1 is a schematic configuration diagram of a battery system in an embodiment of the present invention.
Figure 2:
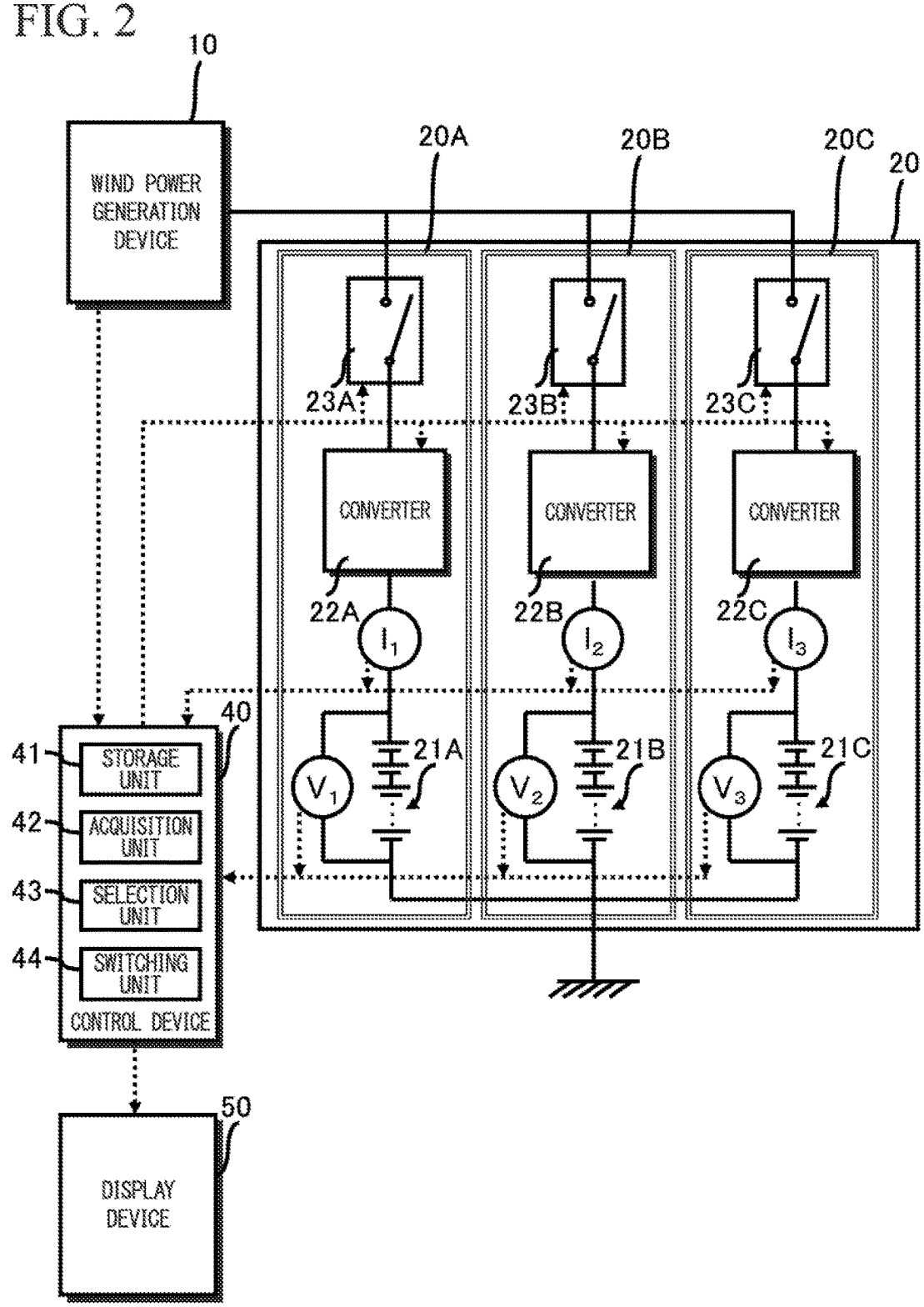
FIG. 2 is a diagram illustrating a specific configuration of a battery device in the embodiment.

FIG. 1 is a schematic configuration diagram of the battery system 1 in the embodiment of the present invention, and FIG. 2 is a diagram illustrating a specific configuration of a battery device 20 and the like. A dotted line illustrated in FIGS. 1 and 2 represents a signal line (a wired or wireless communication line) through which various information can be transmitted and received to and from a control device 40.

As illustrated in FIG. 1, the battery system 1 includes a wind power generation device 10, the battery device 20, a load 30, the control device 40, and a display device 50. This battery system 1 supplies power generated by the wind power generation device 10 to the battery device 20 and supplies power with which the battery device 20 is charged (stored in the battery device 20) to the load 30. The battery system 1 of this embodiment is not limited to the above-described configuration. For example, a configuration in which the power is directly supplied to the load 30 after the power generated by the wind power generation device 10 has been converted may be added. In this case, it is possible to supply power to the load 30 by combining the power generated by the wind power generation device 10 and the power with which the battery device 20 has been charged.

The wind power generation device 10 is a power supply device which generates three-phase AC power (AC power) by rotating a rotator by wind power which is natural energy, and its configuration itself is similar to a general wind power generation device. The wind power generation device 10 supplies the generated AC power to the battery device 20 via a power wiring.

By converting the AC power supplied from the wind power generation device 10 into DC power, the battery device 20 is charged with (stores) the DC power. In addition, the battery device 20 converts the charged DC power into power suitable for the load 30 and supplies the converted power.

As illustrated in FIG. 2, the battery device 20 includes substantially the same battery units 20A to 20C connected in parallel.

The battery unit 20A includes a battery module 21A in which a plurality of chargeable/dischargeable battery cells are connected in series, a converter 22A which receives an input of AC power from the wind power generation device 10 and converts the AC power into DC power, and a switch 23A capable of interrupting the input of the AC power from the wind power generation device 10 to the converter 22A. The battery unit 20B includes a battery module 21B, a converter 22B, and a switch 23B and thus the battery unit 20B has substantially the same function and configuration as the battery unit 20A. The battery unit 20C includes a battery module 21C, a converter 22C, and a switch 23C and thus the battery unit 20C has substantially the same function and configuration as the battery unit 20A. The above-described AC power can be supplied from the same common power wiring to the above-described battery units 20A to 20C. Although the battery system 1 of this embodiment includes the three battery units 20A to 20C connected in parallel, the number of battery units is not limited to three and it is only necessary for the number of battery units to be at least two. Thereby, for example, it is possible to appropriately change the number of battery units according to various conditions such as a maximum power generation power amount of the wind power generation device 10 or a required power amount of the load 30.

Each of the battery modules 21A to 21C is a battery pack serving as a DC power supply configured by connecting a plurality of battery cells in series, and is charged with power converted by one of the converters 22A to 22C. A battery cell constituting each of the battery modules 21A to 21C is a chargeable/dischargeable battery cell. For example, it is possible to use a battery cell of a lithium-ion secondary battery. The number of battery cells constituting each of the battery modules 21A to 21C can be determined according to the maximum power generation power amount of the wind power generation device 10, the number of battery units connected in parallel, or the required power amount of the load 30.

In the battery module 21A, a voltage sensor $V_1$ which measures a voltage across the battery module 21A and a current sensor $I_1$ which measures a current flowing through the battery module 21A are provided. In the battery module 21B, a voltage sensor $V_2$ which measures a voltage across the battery module 21B and a current sensor $I_2$ which measures a current flowing through the battery module 21B are provided. In the battery module 21C, a voltage sensor $V_3$ which measures a voltage across the battery module 21C and a current sensor $I_3$ which measures a current flowing through the battery module 21C are provided. Voltage values measured by the voltage sensor $V_1$ to $V_3$ and current values measured by the current sensors $I_1$ to $I_3$ are transmitted to the control device 40 via the signal line. Although the case in which the voltage sensors $V_1$ to $V_3$ are provided in the battery modules 21A to 21C, respectively, has been described, for example, the voltage sensor may be provided for each of the battery cells constituting the battery modules 21A to 21C.

Figure 3:
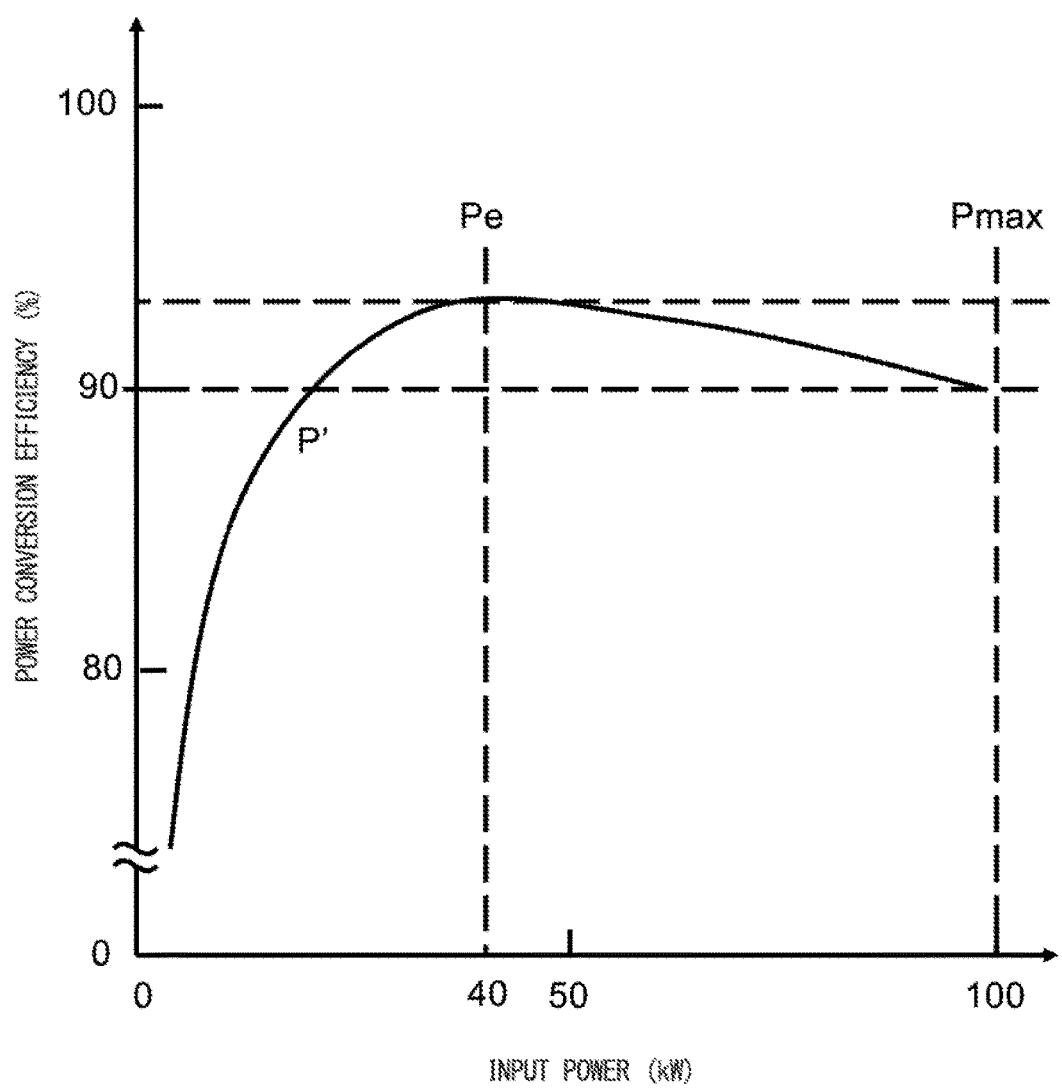
FIG. 3 is a relationship diagram of input power and conversion efficiency of a general converter.

Each of the converters 22A to 22C is a power conversion unit which converts the AC power supplied from the wind power generation device 10 into DC power. The start (ON) and stop (OFF) of each of the converters 22A to 22C are controlled by receiving a command from the control device 40. In general, power loss occurs when the converters 22A to 22C convert the input AC power into the DC power. Here, FIG. 3 is a relationship diagram illustrating a relationship between input power and conversion efficiency of a general converter. A maximum input (maximum input power value) Pmax or an input at maximum efficiency (input power value at maximum efficiency). Pe, differs according to each manufacturer of the converter. As illustrated in FIG. 3, the general converter has a tendency for conversion efficiency to rapidly decrease when input power is less than the input Pe at the maximum efficiency and comparatively gently decrease when the input power is between the input Pe at the maximum efficiency and the maximum input Pmax. Therefore, various converters can be applied to the battery system 1 of this embodiment using the maximum input Pmax or the input Pe at the maximum efficiency which is a generalized value. In the battery system 1 of this embodiment, converters having substantially the same characteristics are used as the converters 22A to 22C.

The switch 23A is a switching means for switching whether to interrupt an input of the AC power from the wind power generation device 10 to the converter 22A via the power wiring. The switch 231B is a switching means for switching whether to interrupt the input of the AC power from the wind power generation device 10 to the converter 22B via the power wiring. The switch 23C is a switching means for switching whether to interrupt the input of the AC power from the wind power generation device 10 to the converter 22C via the power wiring. These switches 23A to 23C switch ON (closing)/OFF (opening) by receiving a command from the control device 40. If the switches 23A to 23C are turned ON, the AC power is supplied from the wind power generation device 10 to the corresponding converters 22A to 22C. If the switches 23A to 23C are turned OFF, the supply of the AC power from the wind power generation device 10 to the corresponding converters 22A to 22C is interrupted. When the switches 23A to 23C are turned OFF, the control device 40 may perform control to stop the converters 22A to 22C corresponding to the switches 23A to 23C. In this case, it is possible to prevent power from being ineffectively consumed by the converters 22A to 22C.

The load 30 receives power supplied from the battery device 20. The load 30 is an AC power load which is driven by the AC power or a DC power load which is driven by the DC power. When the load 30 is the AC power load, an inverter (not illustrated) which converts the DC power of each of the battery units 20A to 20C into the AC power is provided in each of the battery units 20A to 20C. In addition, when the load 30 is the DC power load, a DC-DC converter (not illustrated) which converts the DC power of each of the battery units 20A to 20C into DC power (a DC voltage) desired by the load 30 is provided in each of the battery units 20A to 20C.

The control device 40 controls the battery device 20 to select at least one of the battery units 20A to 20C to which AC power is to be supplied from the wind power generation device 10 based on a supply power amount (power generation power amount) of power capable of being supplied from the wind power generation device 10, the charging states of the battery modules 21A to 21C, and power conversion efficiencies of the converters 22A to 22C. In addition, the control device 40 causes the display device 50 to appropriately display various information such as the supply power amount of the wind power generation device 10 or the charging state of the battery unit by controlling the display device 50.

The control device 40 has a storage unit 41, an acquisition unit 42, a selection unit 43, and a switching unit 44, for example, as illustrated in FIG. 2, as a processing function of charging the battery units 20A to 20C. The control device 40, for example, includes a processor which performs various arithmetic and control operations, a random access memory (RAM) which temporarily stores information (data) and functions as a working area during control, a read-only memory (ROM) which stores a program and the like, and a peripheral circuit, and can implement a processing function of each part described above. A charging operation of the battery system 1, that is, a specific control flow to be performed by the control device 40, will be described later.

The storage unit 41 stores information about reference power values corresponding to predetermined power conversion efficiencies of the converters 22A to 22C. Here, in the battery system 1 of this embodiment, the input Pe at the maximum efficiency corresponding to optimum power conversion efficiency described using FIG. 3 is set to a reference power value corresponding to predetermined power conversion efficiency. The reference power value is not limited to the input Pe at the maximum efficiency, and, for example, can be appropriately set according to characteristics of the configuration of the battery system and the power conversion efficiency of the converter such as that a smallest input power value P' is used among powers at which the power conversion efficiency illustrated in FIG. 3 is greater than or equal to 90%.

The acquisition unit 42 acquires information about a supply power amount of power supplied by the wind power generation device 10 and information about voltage and current values of the battery modules 21A to 21C provided in the plurality of battery units 20A to 20C at a predetermined timing. The acquisition unit 42 calculates a charging rate SOC (state of charge) of each of the battery units 20A to 20C using the well-known arithmetic method according to the acquired voltage and current values, and notifies the selection unit 43 of calculation results. The charging rate SOC is a charging state of the battery module, that is, a ratio (percent) representing a remaining charging capacity to a capacity of the battery at full charging. This charging rate SOC can be calculated using the well-known arithmetic method according to a voltage of every battery module and a current flowing through every battery module. The above-described predetermined timing, for example, can be set to a timing immediately after the initiation of charging and a timing of every fixed time after the initiation of charging.

The selection unit 43 determines the number of battery units capable of distributing the supply power amount at a power amount greater than or equal to the reference power value based on information about the reference power values of the converters 22A to 22C stored in the storage unit 41, information about the supply power amount acquired by the acquisition unit 42, and information about the charging rates SOC of the battery modules 21A to 21C, and selects the battery units to which the power is supplied from the wind power generation device 10 among the plurality of battery units 20A to 20C, wherein the selected battery units are equal in number to the determined number. In addition, when the supply power amount is less than a sum of the reference power values of the plurality of battery units 20A to 20C, the selection unit 43 determines priority for supplying the power to the battery units 20A to 20C in ascending order of charging state (for example, ascending order of charging rate SOC) based on information about the charging rates SOC of the battery modules 21A to 21C, determines the number of battery units capable of distributing the supply power amount at a power amount greater than or equal to the reference power value based on the reference power values, the supply power amounts, and the charging rates SOC of the battery units 20A to 20C, and selects the battery units equal in number to the determined number according to the priority.

The switching unit 44 determines whether the charging state of the battery module provided in at least one battery unit among the battery units 20A to 20C selected by the selection unit 43 is the same as or substantially the same as the charging state of the battery module provided in at least one battery unit among the battery units which are not selected by the selection unit 43. Upon determining that the above-described charging states are the same as or substantially the same as each other, the switching unit 44 supplies power supplied from the wind power generation device 10 to the battery unit selected by the selection unit 43 and having the battery module of the same or substantially same charging state by alternately switching the battery units having the same or substantially same charging state.

The display device 50, for example, displays various information for a user such as the supply power amount of the wind power generation device 10 and the charging state of the battery unit, and for example, is a monitor such as a general liquid crystal panel. The display device 50 may be provided if necessary. The display device 50 may be omitted from the battery system 1 of this embodiment.

Figure 4:
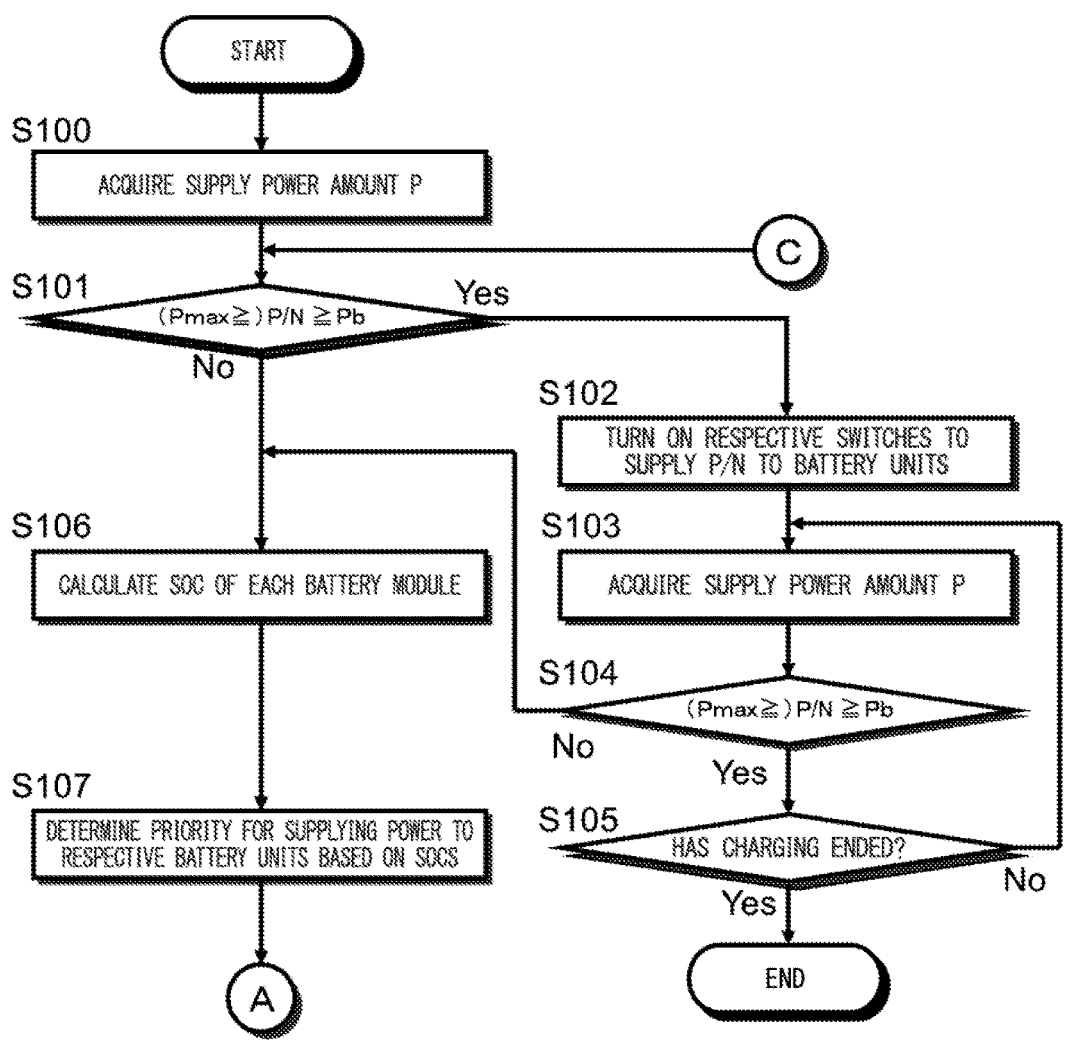
FIG. 4 is a flowchart illustrating operation processing content of the battery system of the embodiment of the present invention.

Hereinafter, a charging operation process of the battery system 1 of this embodiment to be executed using the control device 40 will be described with reference to the flowcharts illustrated in FIGS. 4 to 6. The processes illustrated in the flowcharts of FIGS. 4 to 6 may be executed by arbitrarily changing a sequence in a range in which no contradiction occurs in processing content or executed in parallel.

Upon the charging operation process of the battery system 1 is described, the battery system 1 illustrated in FIGS. 1 and 2 is used. Further, the following particulars are assumed. The number of battery units is represented by a fixed value N. As illustrated in FIG. 2, the three battery units 20A to 20C are used and N=3 is set. A maximum input power value of each of the converters 22A to 22C is represented by a fixed value Pmax, and Pmax=100 kW is set. In addition, an input power value at the maximum efficiency is represented by a fixed value Pe and Pe=40 kW is set. Consequently, a maximum permissible input power of the battery device 200 illustrated in FIG. 2 becomes N×Pmax=300 kW. Further, in the control device 40, the input power value Pe (=40 kW) at the maximum efficiency corresponding to optimum power conversion efficiency is stored in the storage unit 41 in advance as a reference power value Pb having predetermined power conversion efficiency in the converters 22A to 22C.

In addition, as a further assumption, the charging state of each battery cell is represented using the charging rate SOC of the battery unit. In addition, it is assumed that the charging rates SOC (the charging rates SOC of the initial values before the charging operation process of the battery system 1) of the battery modules 21A to 21C before charging are 80%, 60%, and 70%, respectively.

Hereinafter, the charging operation process of the battery system 1 will be described under the above assumptions.

First, the control device 40 acquires information about the supply power amount P of the wind power generation device 10 from the wind power generation device 10 (step S100). In this charging operation process, it is assumed that the control device 40, for example, acquires information indicating that the supply power amount P of the wind power generation device 10 is 100 kW from the wind power generation device 10.

Then, the control device 40 divides the supply power amount P from the information about the supply power amount P acquired from the above-described wind power generation device 10 by the number N of battery units. The control device 40 determines whether a division value P/N is greater than or equal to the reference power value Pb (step S101). That is, in this charging operation process, the control device 40 determines whether a value P/N obtained by dividing 100 kW which is a supply power amount P by "3" which is the number N of battery units is greater than or equal to 40 kW which is the reference power value Pb.

When a result of the above-described determination indicates that the division value P/N is greater than or equal to the reference power value Pb (step S101: Yes), the control device 40 transmits a control signal to the switches 23A to 23C of the battery units 20A to 20C via the signal line, and turns ON the switches 23A to 23C (step S102). In this case, because each of powers input to the converters 22A to 22C is greater than or equal to the reference power value Pb even when the switches 23A to 23C are turned ON, the battery modules 21A to 21C can be charged in a state in which power conversion efficiencies of the converters 22A to 22C are high. When the switches 23A to 23C are turned ON, the control device 40 also transmits a control signal to the converters 22A to 22C of the battery units 20A to 20C via the signal line and starts the converters 22A to 22C.

After the process of step S102, the control device 40 again acquires information about the supply power amount P from the wind power generation device 10 (step S103). The control device 40 divides the supply power amount P from the acquired information about the supply power amount P by the number N of battery units, and determines whether the division value P/N is greater than or equal to the reference power value Pb (step S104). The processes of steps S103 and S104 are a process of determining whether it is better to change the number N (=3) of battery units which receive the supply of power in order to maintain the charging efficiency at a high level in the battery system 1 when the supply power amount P has been varied after the passage of a predetermined time. In the process before step S103, the number N (=3) of battery units which receive the supply of power is determined based on the supply power amount P acquired in the process of step S101. This number N is determined to be the number N in which power greater than or equal to the reference power value Pb can be supplied to the battery units 20A to 20C when the supply power amount P has been distributed to the battery units 20A to 20C. However, because the supply power amount P is varied in the power supply device using natural energy such as the wind power generation device 10, the optimum number of battery units which receives the supply of power greater than or equal to the reference power value Pb is also varied. Therefore, it is preferable to change the optimum number of battery units which receives the supply of power according to the supply power amount P. The timing at which the information about the supply power amount P is acquired, for example, can be appropriately set according to a factor such as a characteristic of the wind power generation device 10.

In the process of step S104, when the above-described division value P/N is greater than or equal to the reference power value Pb, that is, when the number N of battery units which supply power need not be changed (step S104: Yes), the control device 40 determines whether charging on the battery modules 21A to 21C has ended (step S105). Here, the charging on the battery modules 21A to 21C ends, for example, when all the battery modules 21A to 21C have been fully charged or when it is necessary to discharge power with which the battery modules 21A to 21C have been charged. When charging ends (step S105: Yes), this process flow ends. When the charging does not end (step S105: No), the process moves to the process of step S103. In this charging operation process, when the supply power amount P is 100 kW and the number N of battery units is 3, the processes of steps S102 to S105 are not performed because the division value P/N is about 33 kW and is less than 40 kW which is the reference power value Pb.

When the division value P/N is less than the reference power value Pb in the process of step S101 (or in the process of step S104) (step S101: No (or step S104: No)), the control device 40 acquires information representing charging states of the battery modules 21A to 21C and calculates a charging rate SOC (step S106). In this charging operation process, the division value P/N is about 33 kW and is less than 40 kW which is the reference power value Pb. Thus, the control device 40 acquires voltage values measured by the voltage sensors $V_1$ to $V_3$ and current values measured by the current sensors $I_1$ to $I_3$ as the information representing charging states of the battery modules 21A to 21C from the voltage sensors $V_1$ to $V_3$ and the current sensors $I_1$ to $I_3$ via the signal line. The control device 40 calculates the charging rates SOC of the battery modules 21A to 21C using a well-known arithmetic method from the above-described acquired voltage and current values. As described in the above-described assumptions, in this charging operation process, results of the arithmetic operations by the control device 40 indicate that the charging rates SOC (the charging rates SOC of initial values) before the charging operation processes of the battery modules 21A to 21C are 80%, 60%, and 70%, respectively.

Then, the control device 40 determines the priority for supplying power to the battery units 20A to 20C based on the acquired charging rates SOC of the battery modules 21A to 21C (step S107). That is, the control device 40 determines the priority for supplying power to the battery units 20A to 20C in ascending order of charging rate SOC. In this charging operation process, because the acquired charging rates SOC of the battery modules 21A to 21C are 80%, 60%, and 70%, respectively, the above-described control device 40 assigns first priority to the battery unit 20B, second priority to the battery unit 20C, and third priority to the battery unit 20A as the above-described priority for supplying the power.

Figure 5:
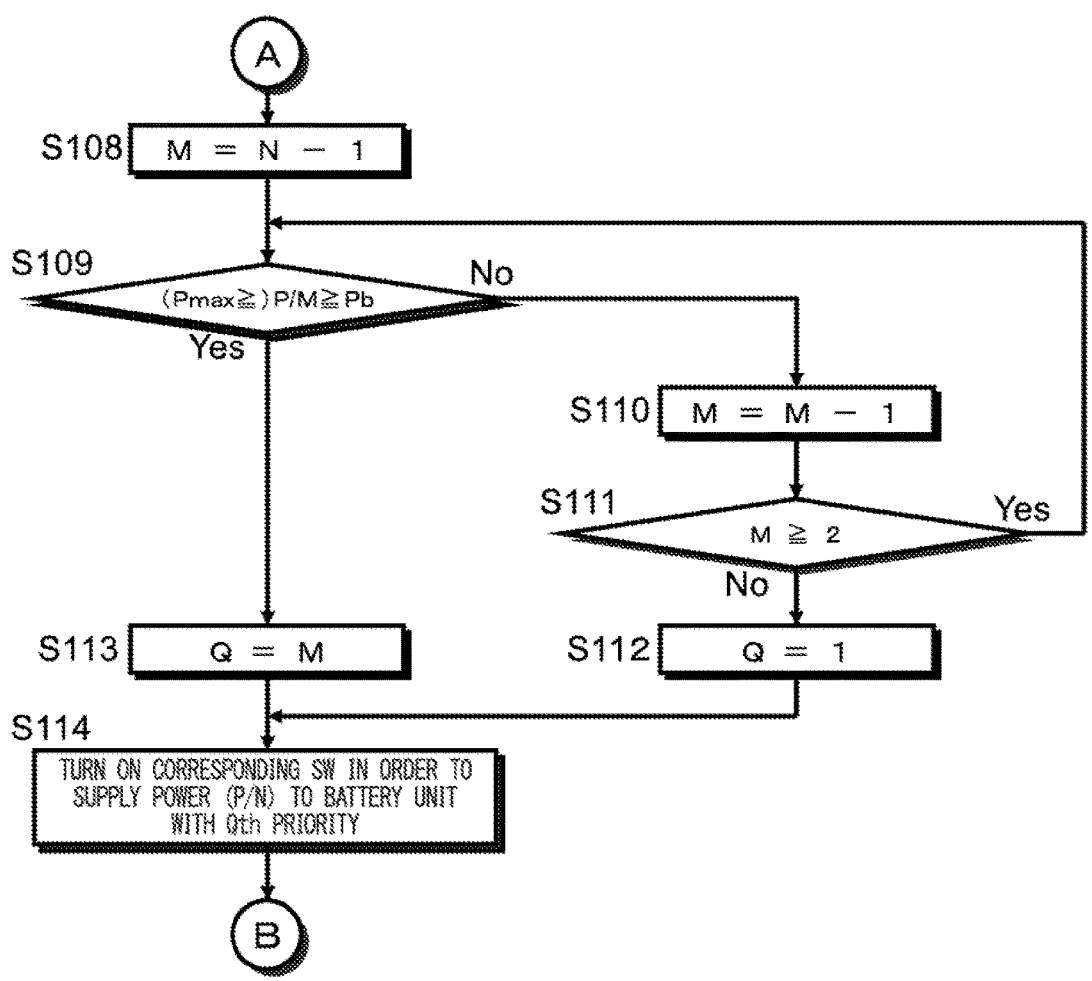
FIG. 5 is a flowchart illustrating the operation processing content of the battery system of the embodiment.

Next, the process moves to the flowchart illustrated in FIG. 5, and the control device 40 represents the number of battery units to which power can be simultaneously supplied (the number of switches capable of being simultaneously turned ON) as a variable M and sets M=N−1 (step S10). The processes of steps S108 to S111 are a process of adjusting the number of battery units to which power is supplied from the wind power generation device 10 so that the power supplied to each battery unit is greater than or equal to the reference power value Pb.

The control device 40 determines whether a value P/M obtained by dividing the supply power amount P by the variable M is greater than the reference power value Pb (step S109). In this charging operation process, it is determined whether a value P/M obtained by dividing 100 kW which is the supply power amount P by "2" which is M (=N(3)−1) is greater than or equal to 40 kW which is the reference power value Pb.

When the above-described division value P/M is less than the reference power value Pb (step S109: No), the control device 40 again sets the variable M to M=M−1 (step S110). The control device 40 returns to the process of step S109 when the variable M is greater than or equal to 2 (step S111: Yes). On the other hand, when the variable M is less than 2 (that is, when the variable M is 1) (step S111: No), the control device 40 represents the number of battery units serving as a target to which power can be supplied as a variable Q and sets Q=1 (step S112).

On the other hand, when the division value P/M is greater than or equal to the reference power value Pb (step S109: Yes), the control device 40 represents the number of battery units serving as the target to which power can be supplied as the variable Q and sets Q=M (step S113). In this charging operation process, Q=M (2) because the above-described division value P/M is 50 kW and this value is greater than 40 kW which is the reference power value Pb.

Then, because power of P/M is supplied to battery units with first to $Q^{th}$ priorities, the control device 40 transmits a control signal to a corresponding switch via the signal line and turns ON the switch (step S114). In this charging operation process, in the process of step S113. Q=2 is set. Thus, the control device 40 turns on the switches 23B and 23C and starts the converters 22B and 22C, and 50 kW is supplied (charged) as supply power to battery units from the battery unit 20B with first priority to the battery unit 20C with second priority. The switches 23B and 23C are turned ON and therefore power greater than or equal to 40 kW which is the reference power value Pb is input to the converters 22B and 22C. As a result, when the battery modules 21B and 21C are charged, power conversion efficiencies of the converters 22B and 22C are maintained in a high state. Results obtained by performing the process so far are shown in a table of FIG. 7A.

Figure 6:
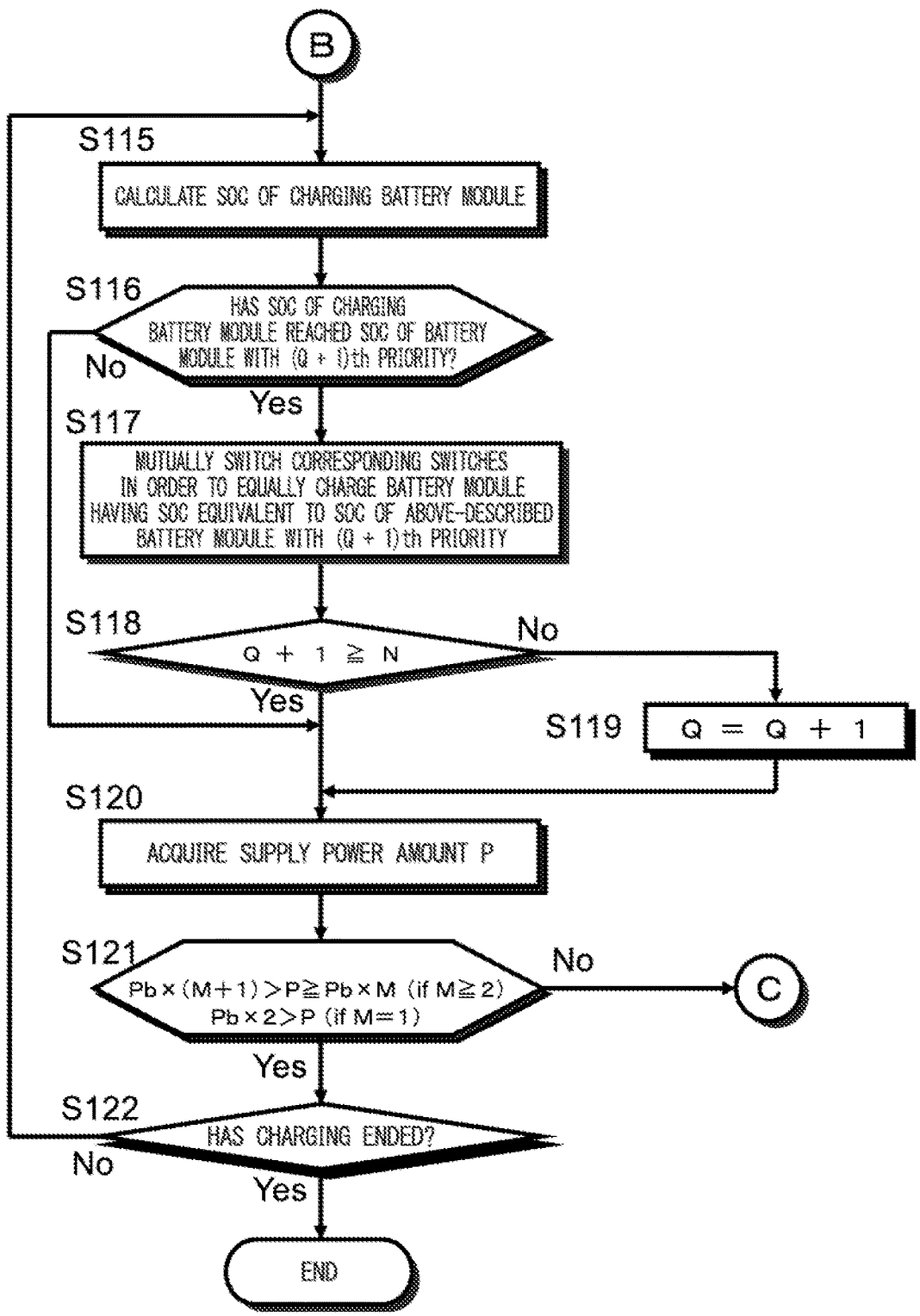
FIG. 6 is a flowchart illustrating the operation processing content of the battery system of the embodiment.

Next, the process moves to the flowchart of FIG. 6. After the process of step S114, the control device 40 acquires information representing the charging state of the charging battery module and calculates the charging rate SOC (step S115). That is, in this charging operation process, the control device 40 acquires voltage and current values of the battery modules 21B and 21C as information representing the charging states of the battery modules 21B and 21C from the voltage sensors $V_2$ and $V_3$ and the current sensors $I_2$ and $I_3$ via the signal line. Further, the control device 40 calculates the charging rates SOC of the battery modules 21B and 21C using the acquired voltage and current values of the battery modules 21B and 21C. In the process of step S115, the control device 40 may be configured to acquire the voltage and current values of all the battery modules 21A to 21C as well as the charging battery modules from the voltage sensors $V_1$ to $V_3$ and the current sensors $I_1$ to $I_3$ via the signal line, and calculate the charging rate SOC of each of the battery modules 21A to 21C. In this case, in the following process of step S116 or the like, it is possible to make a more accurate determination.

Then, based on the above-described acquired charging rates SOC of the charging battery modules, the control device 40 determines whether the charging rate SOC of the charging battery module has reached (is the same as or substantially the same as) the charging rate SOC of the battery module with $(Q+1)^{th}$ priority (step S116). In this charging operation process, because the charging rate SOC of the battery module 21A with $((Q+1)=3)^{th}$ priority is 80%, the control device 40 determines whether the charging rate SOC of at least one of the charging rate SOC of the battery module 21B and the charging rate SOC of the charging battery modules 21C has reached 80%.

When the charging rate SOC of the charging battery module has reached the charging rate SOC of the battery module with the $(Q+1)^{th}$ priority (step S116: Yes), the control device 40 transmits a signal to a corresponding switch via the signal line so that power P/M is equally supplied to the battery unit having the charging battery module, which has reached the charging rate SOC of the battery module with the $(Q+1)^{th}$ priority, and the battery unit having the battery module with the $(Q+1)^{th}$ priority, and mutually switches ON and OFF of the switches at a predetermined timing (step S117). At this time, the above-described power of P/M is supplied to the battery unit which has not yet reached the charging rate SOC of the battery module with the $(Q+1)^{th}$ priority.

On the other hand, when the above-described charging rate SOC of the charging battery module has not reached the charging rate SOC of the battery module with the $(Q+1)^{th}$ priority (step S116: No), the process moves to the process of step S120.

In this charging operation process, for example, as shown in a table of FIG. 7B, assuming that the charging rate SOC of the battery module 21C provided in the charging battery unit 20C has reached the charging rate SOC (=80%) of the battery module 21A provided in the battery unit 20A with the $((Q+1)=3)^{th}$ priority, the control device 40 performs control so that a power of 50 kW is mutually supplied to the battery units 20A and 20C and the switches 23A and 23C are mutually switched ON and OFF at a predetermined timing. That is, 50 kW is alternately supplied to the battery units 20A and 20C. As a result, the battery modules 21A and 21C are equally charged. At this time, the power of 50 kW is still supplied to the battery unit 20B and the battery module 21B is charged. The above-described predetermined timing at which the above-described switches 23A and 23C are mutually switched can be, for example, every 50 to 100 msec.

Here, the control device 40 determines whether a relational expression of Q+1≥N is satisfied (step S118). This is a process in which the control device 40 determines whether there is still a battery unit which does not serve as a possible supply target. If it is not true that Q+1≥N (step S118: No), the control device 40 again sets the variable Q to Q=Q+1 (step S119). After the process of step S119 or in the process of step S118, in the case of Q+1≥N (step S118: Yes), the control device 40 again acquires information about the supply power amount P of the wind power generation device 10 from the wind power generation device 10 (step S120). Because the relational expression of Q+1 (=3)≥N (=3) is satisfied in this charging operation process, the control device 40 again acquires the information about the supply power amount P of the wind power generation device 10 from the wind power generation device 10.

The control device 40 determines whether the value of the supply power amount P acquired in the process of step S120 satisfies a relational expression of Pb×(M+1)>P≥Pb×M if M≥2 and satisfies a relational expression of Pb×2>P if M=1 (step S121). This is a process to be performed to determine whether the supply power amount P acquired in the above-described process of step S120 has been varied to exceed a predetermined power amount range compared to the supply power amount P acquired in the previous process (for example, the supply power amount P acquired in the process of step S101). The above-described predetermined power amount range, for example, is a range of variation in the supply power amount P when a change in the number M of battery units to which power is supplied from the wind power generation device 10 improves charging efficiency in the battery system 1. If the above-described relational expression is satisfied (step S121: Yes), the process moves to the process of step S122. If the above-described relational expression is not satisfied (step S121: No), the process moves to the process of step S101.

Assuming that the supply power amount P acquired in the above-described process of S120 is the same as 100 kW of the previous supply power amount P in this charging operation process, the process moves to the process of step S122 because the reference power value Pb is 40 kW and the number M of battery units to which power can be simultaneously supplied (the number of switches capable of being simultaneously turned ON) is 2 and because the relational expression of Pb×(M+1)>P≥Pb×M, that is, 40 kW×(2+1) (=120 kW)>P≥40 kW×2 (=80 kW), is satisfied.

When the control device 40 determines that the charging has not ended in the process of step S122 (step S122: No), the process returns to the process of step S115. On the other hand, when the control device 40 determines that the charging has ended in the process of step S122 (step S122: Yes), the operation process of the battery system 1 ends.

Charging is assumed to still be in progress at the current stage in this charging operation process, and the process returns to the process of step S115. In the process of step S116, it is assumed that the charging rate SOC of the battery module 21A (also equal to the charging rate SOC of the battery module 21C) provided in the battery unit 20A with $(Q+1)^{th}$ $(=3^{rd})$ priority is the same as or substantially the same as the charging rate SOC of the battery module 21B provided in the battery unit 20B at about 87% as shown in a table of FIG. 7C. In this case, in the process of step S117, the control device 40 transmits a signal to a corresponding switch and alternately switches ON and OFF of the switches at a predetermined timing so that the above-described power of P/M (=50 kW) is supplied to two battery units among the battery units 20A to 20C. For example, the control device 40 mutually switches ON and OFF of the switches 23A to 23C at the predetermined timing so that two battery units of the battery units 20A to 20C are sequentially selected and the power of 50 kW is supplied to the selected battery units in a cycle in which the power of 50 kW is first supplied to each of the battery units 20A and 20B, the power of 50 kW is then supplied to each of the battery units 20A and 20C, and the power of 50 kW is further supplied to each of the battery units 20B and 20C. That is, two battery modules are alternately selected among the battery units 20A to 20C and 50 kW is supplied to the selected two battery modules. Then, the process proceeds to the process from step S120 and this process flow ends when the control device 40 determines that the charging ends.

The battery system 1 of this embodiment operates as described above. Although the case in which the supply power amount P of the wind power generation device 10 is 100 kW in the first process of step S100 has been described in the above-described charging operation process, another example in which the supply power amount P is 50 kW will be briefly described hereinafter referring to FIGS. 8A to 8C and using FIGS. 4 to 6 described above.

First, in the process of step S100, the control device 40 acquires information about the supply power amount P (50 kW) from the wind power generation device 10. Then, in the process of step S101, the control device 40 performs the processes of steps S106 to S108 as described above by determining that a value (about 16 kW) obtained by dividing the supply power amount P (=50 kW) by the number N (=3) of battery units is less than the reference power value Pb (=40 kW).

Thereafter, in the process of step S109, the control device 40 determines that a value of 25 kW obtained by dividing the supply power amount P (=50 kW) by M (=2) is less than the reference power value Pb (=40 kW), and performs the process of step S111 after again setting M=1 in the process of step S110. The control device 40 determines that M≥2 is not satisfied because M=1 in the process of step S111, and sets the number Q of battery modules serving as a target to which power can be supplied is set to Q=1 in the process of step S112. Then, to supply the supply power amount P (=50 kW) to the battery unit 20B with first priority in the process of step S114, the control device 40 transmits a control signal only to the corresponding switch 23B via the signal line, and turns ON the switch 23B. Results obtained by performing the process up to step S114 are shown in a table of FIG. 8A.

Then, the process moves to the process of steps S115 and S116. When the control device 40 determines that, in the process of step S116, the charging rate SOC of the battery module 21C provided in the battery unit 20C with second $(=(Q+1)^{th})$ priority is 70% as shown in a table of FIG. 8B, and the battery module 21B provided in the battery unit 20B has reached the charging rate SOC same as that of the battery module 21C, the process moves to the process of step S117. In the process of step S117, the control device 40 mutually switches ON and OFF of the switches 23B and 23C through which power is supplied to the battery units 20B and 20C at a predetermined timing. That is, 50 kW is alternately supplied to the battery units 20B and 20C. As a result, it is possible to equally charge the battery modules 21B and 21C. Then, the control device 40 determines that Q+1≥N (currently, Q=1 and N=3) is not satisfied in the process of step S118 and again sets Q=2 in the process of step S119, and the process moves to the process of step S120.

Then, assuming that the supply power amount P acquired by the control device 40 is the same as 50 kW of the previous supply power amount P in the process of step S120, the process proceeds to the process of step S121. Then, because the reference power value Pb is 40 kW and the number M of battery units to which power can be simultaneously supplied is 1 and because the relational expression of Pb×2>P, that is, 40 kW×2 (=80 kW)>P, is satisfied in the process of step S121, the process moves to the process of step S122.

Then, charging is assumed to still be in progress at the current stage in the process of step S122, and the process returns to the process of step S115. When the control device 40 determines that the charging rate SOC of the battery module 21A provided in the battery unit 20A with third $(=(Q+1)^{th})$ priority is 80% as shown in a table of FIG. 8C and both the battery modules 21B and 21C have reached the charging rate SOC same as that of the battery module 21A in the process of step S116, the process moves to the process of step S117. In the process of step S117, the control device 40 sequentially alternately switches ON and OFF of the switches 23A, 23B, and 23C through which power is supplied to the battery units 20A, 20B, and 20C at a predetermined timing. For example, the control device 40 sequentially selects one battery unit of the battery units 20A to 20C and supplies power of 50 kW to the selected battery unit in a cycle in which the power of 50 kW is first supplied to the battery unit 20A, the power of 50 kW is then supplied to the battery unit 20B, and the power of 50 kW is further supplied to the battery unit 20C. That is, 50 kW is alternately supplied to the battery units 20A to 20C. As a result, it is possible to equally charge the battery modules 21A, 21B, and 21C. Then, the process proceeds to the process from step S120 and this process flow ends when the control device 40 determines that the charging ends.

According to the battery system 1 of this embodiment, it is possible to charge an optimum number of battery modules by maintaining a high charging rate because it is possible to select a battery unit to which power is supplied among the plurality of battery units 20A to 20C connected in parallel according to a supply power amount from the wind power generation device 10 while also considering power conversion efficiencies of the converters 22A to 22C.

In addition, according to the battery system 1 of this embodiment, it is possible to easily equalize the charging states of the battery modules by acquiring charging information representing the charging states of the battery modules 21A to 21C and determining priority for supplying power to the battery units in ascending order of charging state. In addition, variation in a voltage between battery modules by a factor such as a usage situation of each battery module or the presence of a deteriorated battery module among a plurality of battery modules is also assumed. In this case, if the plurality of battery modules connected in parallel are merely simultaneously charged, mutual charging action may be caused between the battery modules and the charging efficiency may be decreased. However, it is possible to select battery units having battery modules with charging states close to each other and distribute and supply power to the selected battery units even when the power is supplied to a plurality of battery units because priority is determined in ascending order of charging state. Thus, it is possible to suppress mutual charging action due to a voltage difference between the battery modules or the like.

Further, according to the battery system 1 of this embodiment, when the charging state of the charging battery module selected by the selection unit 43 is the same as or substantially the same as the charging state of the battery module provided in at least one battery unit among non-selected battery units, a supply destination of power supplied from the wind power generation device 10 is alternately switched between the battery units having charging states which are the same as or substantially the same as each other at a predetermined timing. As a result, the charging state is improved to a certain level and power is equally supplied to at least two battery units having charging states which are the same or substantially the same as each other. On the other hand, it is possible to continuously supply power to a battery unit of a low charging state. That is, it is possible to perform charging early so that power is continuously supplied to a battery unit with a low charging state and a charging rate equivalent to that of another battery module is reached. In addition, it is possible to perform charging in a state in which equivalence for battery units in which charging states of battery modules are the same as or substantially the same as each other has been maintained.

Further, according to the battery system 1 of this embodiment, it is possible to determine the optimum number of battery units which receive the supply of power according to the supply power amount P and constantly maintain a high charging rate even when the supply power amount P has been varied by acquiring information about the supply power amount P of power supplied by the wind power generation device 10 at a predetermined timing.

Modified Examples

The preferred embodiments of the battery system of the present invention have been described above. However, the invention is not limited to the above-described embodiments, and various modifications, additions, and omissions can be made by those skilled in the art without departing from the spirit and scope represented in the claims.

For example, although the wind power generation device has been described as an example of the power supply device in the above-described embodiment, the present invention is not limited thereto. For example, there may be a power supply device using solar power generation or commercial power generation. When a solar power generation device is used as the power supply device, a DC/DC converter may be used as a power conversion unit disposed between a power supply and a battery unit. In this case, the above-described reference power value is appropriately set from power conversion efficiency of the DC/DC converter. In addition, as long as power of a fixed power amount can be received as in a commercial power supply as the power supply device, for example, the control device 40 may be configured to acquire information about the supply power amount P only immediately after the initiation of charging.

Further, although the case in which the control device 40 acquires charging information about charging states of battery modules has been described in the above-described embodiment, the present invention is not limited thereto. For example, when it is available to use the battery system under a condition that charging states between the battery units are equal to a certain level, the acquisition of the charging information may be omitted. Even in this case, the control device 40 can select a battery unit to which power to be supplied among the plurality of battery units 20A to 20C connected in parallel according to the supply power amount from the wind power generation device 10 and in consideration of power conversion efficiencies of the converters 22A to 22C, and then control ON and OFF of the switches 23A to 23C to be sequentially mutually switched so that power is equally supplied to the battery units 20A to 20C including a non-selected battery unit.

Further, although the control device 40 is configured to determine priority for supplying power to a battery unit in ascending order of charging state based on charging information and supply the power in the determined priority in above-described embodiment, the present invention is not limited thereto. For example, when variation in the charging state of each battery module from the charging information falls within a predetermined range, the control device 40 may select a battery unit to which power to be supplied among the plurality of battery units 20A to 20C connected in parallel according to the supply power amount from the wind power generation device 10 while also considering power conversion efficiencies of the converters 22A to 22C and control ON and OFF of the switches 23A to 23C to be sequentially mutually switched so that power is equally supplied. On the other hand, when there is a battery unit of the charging state which does not fall within the predetermined range, the control device 40 may be configured to continuously supply power only to the battery unit of the charging state which does not fall within the predetermined range and equally supply power by mutually switching switches with other battery units.

Further, although the control device 40 is configured to alternately switch a supply destination of power supplied from the power supply device between the battery units having charging states which are the same or substantially the same as each other when a charging state of a charging battery module selected by the selection unit 43 is the same as or substantially the same as the charging state of the battery module provided in at least one battery unit among non-selected battery units in the above-described embodiment, the present invention is not limited thereto. For example, the control device 40 may stop the supply of power to a non-selected battery unit until charging states of all selected charging battery modules are the same as or substantially the same as the charging state of a battery module provided in the non-selected battery unit.

Further, although a configuration in which parts having processing functions are provided in the control device 40 has been described in the above-described embodiment, the present invention is not limited thereto. The parts may also be configured on a network communicably connected to the control device 40 or in another device. Further, although the parts are provided in the control device 40 according to purpose, some of the parts provided in the control device 40 may be configured to be integrated and one part may be configured to be divided into a plurality of parts.

INDUSTRIAL APPLICABILITY

The battery system of the present invention can be applied to a system using battery modules provided in a plurality of battery units in at least charging. For example, the battery system of the present invention can be used as a movement system in which power is stored in a secondary battery at a regeneration time of a motor such as an electric vehicle and the power stored in the secondary battery is used at the driving time of the motor. In addition, the present invention can be used as a stationary system such as a power storage system in which power generated using natural energy such as wind power generation or solar power generation is stored in a secondary battery and the power stored in the secondary battery is used in an electrical facility at home or a power selling system which sells the power stored in the secondary battery to a power system serving as an AC power load.

REFERENCE SIGNS LIST

1 Battery system
10 Wind power generation device (power supply device)
20 Battery device
20A to 20C Battery unit
21A to 21C Battery module
22A to 22C Converter (power conversion unit)
23A to 23C Switch
30 Load
40 Control device
50 Display device

The invention claimed is:

1. A battery system comprising:
a power supply device which supplies power;
a battery device in which a plurality of substantially identical battery units are connected in parallel, wherein each battery unit includes a power conversion unit which converts the power supplied from the power supply device and a battery module which is charged with power converted by the power conversion unit; and
a control device including a storage unit which stores information about a reference power value corresponding to predetermined power conversion efficiency of the power conversion unit, an acquisition unit which acquires information about a supply power amount of the power supplied by the power supply device and charging information representing a charging state of the battery module provided in each of the plurality of battery units, a selection unit which determines the number of battery units capable of distributing the supply power amount at a power amount greater than or equal to the reference power value based on the information about the reference power value stored in the storage unit and the information about the supply power amount acquired by the acquisition unit and selects the battery units to which the power is supplied from the power supply device among the plurality of battery units, wherein the selected battery units are equal in number to the determined number, and a switching unit through which the power supplied from the power supply device is alternatively supplied to a first battery unit selected by the selection unit and to a second battery not selected by the selection unit when the charging state of the battery module of the first and second battery units are substantially the same.

2. The battery system according to claim 1,
wherein the selection unit determines the number of battery units capable of distributing the supply power amount at a power amount greater than or equal to the reference power value based on the information about the reference power value stored in the storage unit and the information about the supply power amount and the charging information acquired by the acquisition unit, and selects the battery units to which the power is supplied from the power supply device among the plurality of battery units, wherein the selected battery units are equal in number to the determined number.

3. The battery system according to claim 1,
wherein the acquisition unit acquires the information about the supply power amount of the power supplied by the power supply device at a predetermined timing.

4. The battery system according to claim 1,
wherein the predetermined power conversion efficiency is maximum power conversion efficiency in the power conversion unit.

5. The battery system according to claim 1,
wherein the predetermined power conversion efficiency is maximum power conversion efficiency in the power conversion unit.

6. The battery system according to claim 2,
wherein, when the supply power amount is less than a sum of reference power values of the plurality of battery units, the selection unit determines priority for supplying the power to the battery unit in ascending order of charging state based on the charging information acquired by the acquisition unit, determines the number of battery units capable of distributing the supply power amount at a power amount greater than or equal to the reference power value based on the information about the reference power value stored in the storage unit and the information about the supply power amount and the charging information acquired by the acquisition unit, and selects the battery units equal in number to the determined number according to the priority.

7. The battery system according to claim 2,
wherein the acquisition unit acquires the information about the supply power amount of the power supplied by the power supply device at a predetermined timing.

8. The battery system according to claim 2,
wherein the predetermined power conversion efficiency is maximum power conversion efficiency in the power conversion unit.

9. The battery system according to claim 3,
wherein the predetermined power conversion efficiency is maximum power conversion efficiency in the power conversion unit.

10. The battery system according to claim 6,
wherein the acquisition unit acquires the information about the supply power amount of the power supplied by the power supply device at a predetermined timing.

11. The battery system according to claim 6,
wherein the predetermined power conversion efficiency is maximum power conversion efficiency in the power conversion unit.

12. The battery system according to claim 7,
wherein the predetermined power conversion efficiency is maximum power conversion efficiency in the power conversion unit.

13. The battery system according to claim 10,
wherein the predetermined power conversion efficiency is maximum power conversion efficiency in the power conversion unit.

* * * * *